INVENTOR
JOHN S. ATTINELLO

BY *Irvin A. Lavine*

ATTORNEY

United States Patent Office 3,493,370
Patented Feb. 3, 1970

3,493,370
WIDE LATITUDE COLOR PROCESS
John S. Attinello, 6474 Woodridge Road,
Alexandria, Va. 22312
Filed June 8, 1966, Ser. No. 556,146
Int. Cl. G03c 7/20; G03f 1/00
U.S. Cl. 96—30                    3 Claims

ABSTRACT OF THE DISCLOSURE

A photographic process in which three sections of film, each comprising three emulsion layers sensitive to the same region of the visible spectrum and each having three speed sensitivity layers with each layer having a different dye coupler, are each exposed through a distinct color separation filter. Thereafter, the emulsion layers are color developed, and the film sections are each exposed through three color separation filters onto three matrices. The matrices from each film section are dyed a different color, and some or all of the matrices are then used for making a print.

---

It is known that the human eye is capable of responding to a great variation in illuminance of a scene due to its automatic gain control; for instance the human eye can distinguish detail in illuminance ranges in a given scene from approximately $10^{-1}$ to $10^{-7}$ candles per square centimeter. Because the normal range of black and white or color film is approximately 100:1 or 1000:1 it will be understood that the human eye is therefore capable of observing variances in the dynamic range of 1,000,000:1, which is of course far greater than can be recorded by known photographic processes. In fact, experience has shown that human observers have been able to perceive scenes of extreme dynamic ranges, but photographic equipment and processes heretofore known have not been able to photographically record these scenes over the entire range in a single exposure.

As an illustration of scenes with extreme dynamic range, one may take as an exemplary scene an illuminated building at night. The lights shining on the building cause the building to have a high brilliance. On the other hand, there are areas of the terrain, shrubs, etc. surrounding the building which are not illuminated, or are illuminated to a much lesser extent than the building itself. With ordinary film, a photograph may show the details of the illuminated building, but the non-illuminated areas of the scene will be substanitally black and details will be completely indescernible. This is the case when the camera has been adjusted, taking into consideration the speed of the film, and an exposure made in order to record the highly illuminated building. On the other hand, if an attempt is made to photograph the less well illuminated areas of the secene, the light intensity from the illuminated building will pass to the photographic emulsion and thereby overexpose the emulsion over the area upon which the image of the illuminated building impinges, so that most or all of the details of the illuminated building are lost and indescernible, being substantially completely white. It will thus be seen that with existing equipment and processes, it is not possible to obtain a photograph, either color or black and white, of a scene of extreme dynamic range, as only a portion of the scene can be photographically recorded, and other portions varying greatly in illuminance from the portion primarily photographically recorded will not be recorded with fidelity, if at all.

Attempts to photograph the full range of scenes having great illuminance variation with positive transparency color materials such as "Ektachrome" film, commercially available from Eastman Kodak Company, Rochester, N.Y., have proven unsuccessful. Similarly, negative color materials such as Eastman's "Ektacolor" negative color film, which might also be utilized, exhibit a range no greater than 1000:1. This range is inadequate, even though it is greater than that of the positive color film.

In some instances, it is desirable to take successive photographs of the same or different scenes, the illumination on the object scene in the different exposure being greatly different. In current practice, it is necessary to make some adjustment to the photographic equipment, the most obvious being that of adjusting the camera so as to admit more or less light in inverse proportion to the illumination of the scene. However, in some instances it is not possible to adjust the camera between exposures.

It is a primary object of the present invention to provide a process for obtaining color photographs of a scene or image having an extreme dynamic range.

Another object of the present invention is to provide a photographic color process in which a dynamic range of the order of one hundred million to one can be achieved.

Yet another object of the present invention is to provide a photographic process in which color photographs of a scene or image having an extreme dynamic range may be made, with great color fidelity.

Yet another object of the present invention is to provide a photographic process by which scenes having different illuminance values may be successively recorded without significant adjustment to the apparatus.

Other objects and the nature and advantages of the instant invention will be apparent from the following description taken in conjunciton with the accompanying drawings, wherein.

Figure 3:
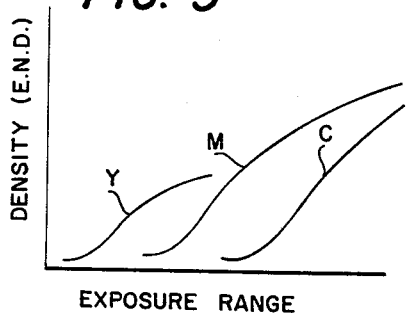
FIG. 3 is a chart illustrating the characteristics of the film of FIG. 2.
Figure 2:
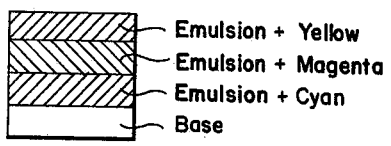
FIG. 2 is a cross-sectional view illustrating the film used in the process.

The present invention photographic color process utilizes extended range film 10, as shown in FIG. 2, which has three panchromatic emulsion layers 11, 12 and 13 on a base 14. The emulsion layers are of different sensitivity levels, and each has a differentiation means incorporated in it, which preferably is a dye coupler. Layer 11 is the fastest, layer 13 the slowest. As shown in FIG. 3, the sensitivity levels or exposure ranges of the emulsions are adjacent and overlapping. The film 10 is described more fully in SPIE Newsletter of June-July 1962, pp. 16–20.

Figure 1:
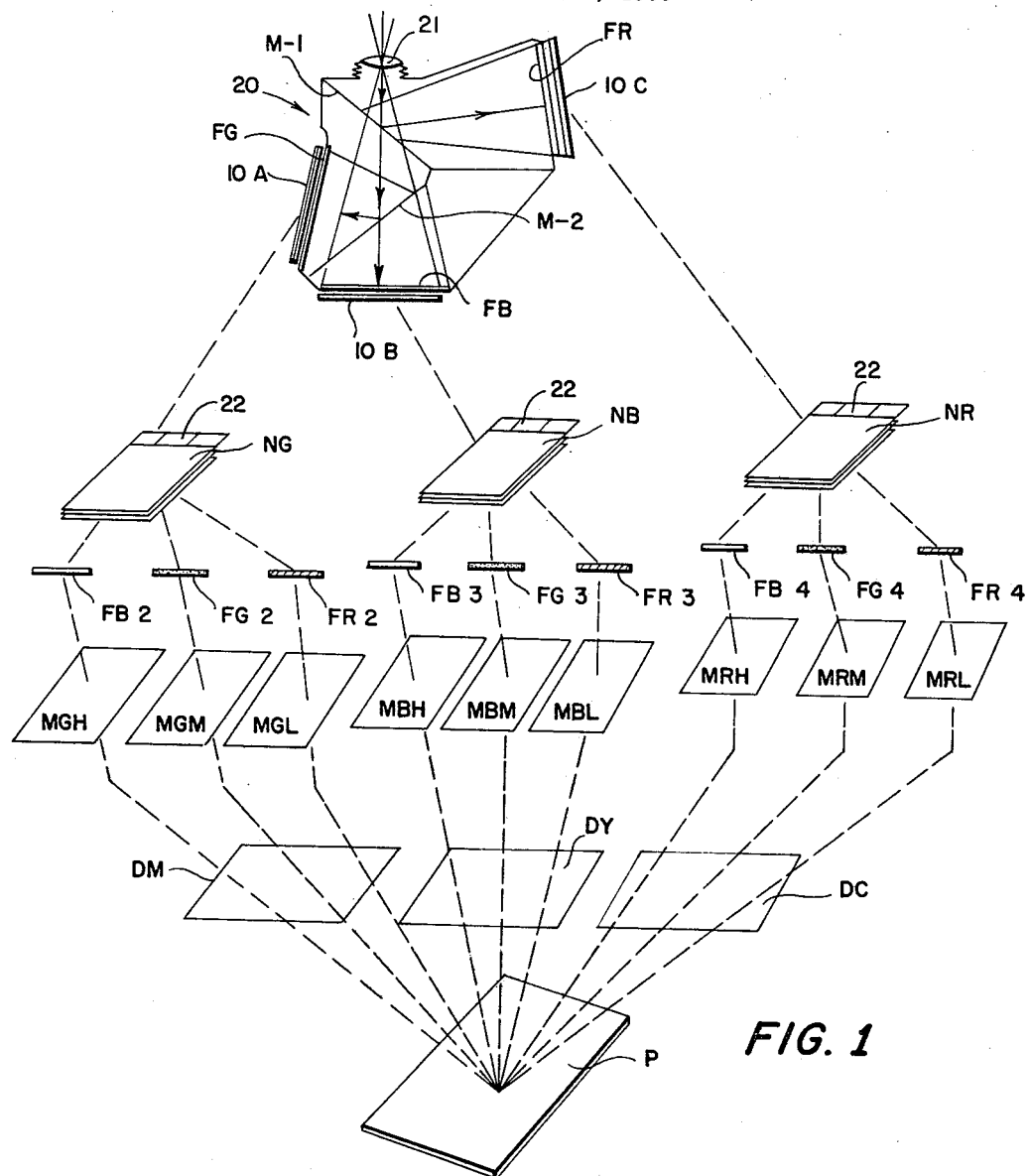
FIG. 1 is a diagrammatic illustration of the present invention.

Referring now to FIG. 1, a "one-shot" camera 20 is diagrammatically illustrated, having a lens 21 for focusing the object scene on each of three film planes by a suitable beam splitter; in camera 20, the beam splitter is in the form of two pellicle mirrors M–1 and M–2. At each film plane there is provided a section of the film 10, designated 10A, 10B and 10C. In front of each section of the film, so as to intercept the light impinging upon the three emulsion film sections 10A, 10B, 10C is a selected color separation filter, and typically there are used a green filter FG, a blue filter FB and a red filter FR. It will therefore be seen that each section of the film receives only that part of the visible spectrum which is permitted to pass to it by the color separation filter which is immediately in front of that particular section of three emulsion film. In practice, filter FR may be a Wratten No. 25, filter FB a Wratten No. 47B and filter FG a Wratten No. 58.

Having thus exposed the three film sections 10A, 10B and 10C of the three emulsion film it will be seen that, for example, the section of film which has received light through the green filter FG from a scene having a wide range of illuminance will have recorded on the emulsion having the fastest speed that portion of the scene having the lowest illumination, and of that portion of the scene, only that portion of the color spectrum transmitted by the green filter. The intermediate speed emulsion layer will record that portion of the scene which is of intermediate illuminance and which has been transmitted by the green filter. The third emulsion layer of the three emulsion film, which is the slowest speed emulsion, will record the most brilliantly illuminated portions of the scene and of those, only those transmitted by the green filter. It will be understood that each emulsion layer may record to some degree, which is an unsatisfactory degree, those portions of the scene which are properly recorded by one of the other layers, and of course in the same green color range. Each of the other sections 10B and 10C of film behind the blue filter FB and red filter FG will record its particular portion of the color spectrum from the object scene, in similar manner. There is thus obtained a green record, a blue record and a red record of the scene photographed.

The three sections of film which have thus been exposed to the same scene at the same instant will then be developed, and for a particular section, each of the three emulsion layers is developed in the same processing step. The three emulsion layers in the film are developed to dye images, rather than to black and white silver images. The top layer 11 contains a coupler of a particular color, for example yellow, to form a yellow dye image. Similarly, intermediate layer 12 forms a magenta dye image and the bottom layer 13 forms a cyan image. Referring specifically to film section 10A which is that section which has been exposed through the green filter FG, the information recorded on the film at the time of its exposure is limited to that portion of the image scene which was green or in the green range. Consequently, even though there is a dying of a portion of the image by, for example, yellow dye to form a yellow dye image, this is in fact a recordation of the portion of the scene which was within (primarily) a certain brilliance range and which was in the green color range. Otherwise stated, one layer of this section 10A of film contains only that information from the object scene which was the most brilliantly illuminated and which was in the green color range; another layer contains only that information which was of intermediate illuminance and of the green color range and the third layer contains information of the least illuminated portion of the object scene and which was in the green color range. The other two film sections 10B and 10C are similarly developed. There are thereby produced three separation negatives; negative NG is a green color record, negative NB is a blue color record and negative NR is a red color record.

Each of the separation negatives may have step wedges 22 of color and grey scales along an edge thereof to permit precision-densitometric measurements and printing exposure control information. These color and grey scales are exposed through the separation filters FG, FB and FR and their images appear on the respective separation negatives NG, NB and NR.

After the separation negatives NG, NB and NR are prepared, the information recorded on each is separated optically through the use of filters, and recorded on three matrices. The term matrices includes other media, such as printing plates. The separation negative NG is exposed through a blue emulsion separation filter FB–2 onto matrix MGH to record thereon the information in the high speed yellow-dyed emulsion of separation negative NG. Matrix MGM is obtained by exposure of negative NG through a green emulsion separation filter FG–2 and thereby records the information in the magenta-dyed medium speed emulsion; matrix MGL is obtained by exposure of negative NG through a red emulsion separation filter FR–2, to record the information in the cyan-dyed slow speed emulsion. There are similarly obtained three matrices MBH, MBM and MBL, recording the information in the three emulsions of negative NB, and three matrices MRH, MRM and MRL, recording the information in the three emulsions of negative NR.

The nine matrices thus obtained are then suitably dyed. The matrices MGH, MGM and MGL, representing the green-record in the high, medium and low speed emulsions may be passed through a magenta dye solution DM, and similarly the three matrices representing the blue-record are dyed yellow by being passed through a suitable dye solution DY. The three matrices representing the red-record are dyed cyan by being passed through a suitable solution DC.

Having obtained the three sets of three dyed matrices, a final print P may be made with any combination of these nine matrices. That is to say, depending upon the information which is desired, from one to nine of these matrices may be used, the selection depending upon the information recorded, and the information desired in the final print. Of course, all nine matrices may be used in obtaining the final print P. The final print P which is obtained may be on a transparent or an opaque support.

As will be understood, rather than using prints so as to arrive at three prints in each of three colors, a final product may be obtained by utilizing the prints as matrices for color printing, or by exposing a material having a relatively transparent film-like base with sensitive layers which are successfully exposed and dyed.

It will be appreciated that a specific example has been given for each step of the inventive process, and specific examples have been given for various components such as filters, dye couplers, etc. Obviously, the selection of the particular components within the overall inventive system is a matter of choice. For example, the particular film selected for illustration is commercially available and has given good results. It may well be possible that a different number and chemistry of emulsion layers would be utilized in the film, so that the process as hereinabove described would be altered to accommodate the number of layers in the film. Through use of the present inventive process, it is possible to obtain color photographs of scenes and/or objects having an extreme dynamic range, the resulting photographs being of great color fidelity for each color throughout the entire range, and the photograph disclosing details of all portions of the scene, including both those which are of great brilliance, and those which are of vastly lesser brillance.

In addition, by the process of the present invention, equipment can be set up and cameras operated automatically and without manual or other adjustment, even though successive scenes may be of vastly different brilliance, and even though the brilliance or illumination of the particular scene which is being photographed is greatly different from that which was anticipated when the equipment was set up.

It will be obvious to those skilled in the art that various changes may be made without departing from the spirit of the invention and therefore the invention is not limited to what is shown in the drawings and described in the specification but only as indicated in the appended claims.

What is claimed is:
1. A photographic process comprising:
  (a) exposing an image through a first color separation filter onto a first section of photographic film which comprises three silver halide emulsion layers sensitve to the same region of the visible spectrum, said layers having a first, second and third speed sensitivity respectively and each of said layers containing a different dye coupler;
  (b) color developing said first section of film to produce a first separation negative having recorded there- in a range of light intensity for a first portion of the color spectrum of the image in a separate color;

(c) exposing said first separation negative through a first color separation filter onto a first section of photographic matrix, said first section of matrix having recorded therein the information contained in the emulsion layer having said first speed sensitivity;

(d) repeating step (c) using a second color separation filter and a second section of photographic matrix to record the information contained in the emulsion layer having said second speed sensitivity;

(e) repeating step (c) using a third color separation filter and a third section of photographic matrix to record the information contained in the emulsion layer having said third speed sensitivity;

(f) repeating steps (a) and (b) for the same image using a second separation filter and a second section of said photographic film to produce a second separation negative containing information for a second portion of the color spectrum of the image;

(g) repeating steps (a), (b) and (c) using said second separation negative and fourth, fifth and sixth sections of said photographic matrix respectively;

(h) repeating steps (a) and (b) for the same image using a third seperation filter and a third section of said photographic film to produce a third separation negative containing information for a third portion of the color spectrum of the image;

(i) repeating steps (c), (d) and (e) using said third separation negative and seventh, eighth and ninth sections of said photographic matrix respectively;

(j) dyeing the first, second and third matrices a first color;

(k) dyeing the fourth, fifth and sixth matrices a second color;

(l) dying the seventh, eighth and ninth matrices a third color; and (m) making a print from at least some of the matrices.

2. The photographic process of claim 1, wherein said sections of film having thereon means for indicating the intensity of exposure thereof.

3. The photographic process of claim 2, said means comprising a pre-exposed step-wedges of color and grayscales.

References Cited

UNITED STATES PATENTS 3,162,533   12/1964   De Pelsmaker et al. _____ 96—6

FOREIGN PATENTS 982,383   2/1965   Great Britain.

OTHER REFERENCES

Camera, pages 41–2, January 1964, 96–74.

Cornwell-Clyne, "Colour Cinematography." pages 462–4 and 509–511, Chapman & Hall, London (1951).

J. TRAVIS BROWN, Primary Examiner

U.S. Cl. X.R.

96—23